Figure 1:
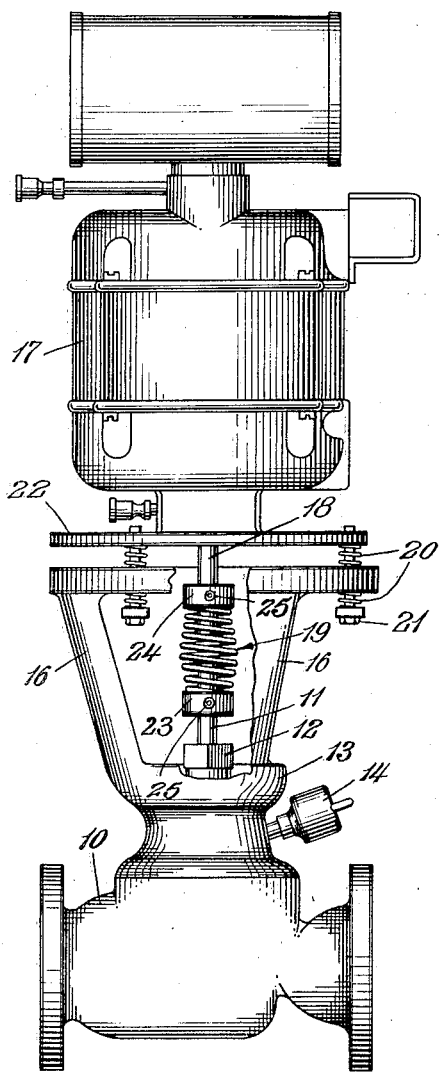

Sept. 8, 1936.  H. A. THRUSH  2,054,009
FLEXIBLE COUPLING
Original Filed Dec. 7, 1934

Inventor
H. A. Thrush

By  [signature]
Attorney

Patented Sept. 8, 1936

2,054,009

UNITED STATES PATENT OFFICE 2,054,009

FLEXIBLE COUPLING

Homer A. Thrush, Peru, Ind.

Original application December 7, 1934, Serial No. 756,557. Divided and this application August 30, 1935, Serial No. 38,636

4 Claims. (Cl. 64—15)

This invention relates to flexible connections and more particularly to such connections adapted for use in the connection between a driving and driven member in which moderate power is transmitted at a high speed such as between an electric motor and a rotary impeller for pumping or circulating fluid in a heating system. Absolute alignment in the motor shaft and impeller shaft in such an organization is also impossible from a production standpoint for accomplishing the results desired, which makes it necessary that there must be the greatest degree of resiliency in the coupling between these two shafts.

An object of the invention is to provide a flexible connection which will reduce the noise and vibration resulting from the use of a high-speed driving motor, such as an electric motor, since the fluid in the system transmits such noise and vibration throughout the system. In the case of a heating system it is possible by the use of this invention to reduce the noise in the piping and heating radiators to a point where it is inaudible.

Another object of the invention is to improve the construction of the drive mechanism of a rotary device, as a pump, particularly with reference to the connection between the drive shaft and the shaft of the pump or driven device.

Another object of this invention is to provide a flexible coupling in such organizations with the greatest degree of resiliency with minimized vibration and noise. Such a coupling includes a barrel type spring with the largest diameter of the spring at the center which is the weakest or most flexible point of this spring and the means for fastening the spring to the shafts located at the ends or least resilient portion thereof. This has the effect of leverage from the center of the spring, which may be operated at a great degree of flexibility due to the extreme resiliency of the spring being so centered at its middle position; in comparison it is to be noted that a straight spring maintains substantially the same resiliency throughout its length. In actual practice this barrel spring coupling has been found to reduce vibration between the motor shaft and the impeller shaft; it dampens the vibration and noise due to the fact that the spring having turns of different radii,—unequal length of each spiral of the spring,—have different periods of oscillation, which is decidedly advantageous over springs with a uniform diameter.

A further object of the invention is to provide a flexible coupling with shaft connectors mounted on the ends of the spring in such a manner as to provide a proper balance and true alignment of the connectors which are swaged onto the spring ends for attaching them to the motor shaft and pump shaft.

Figure 2:
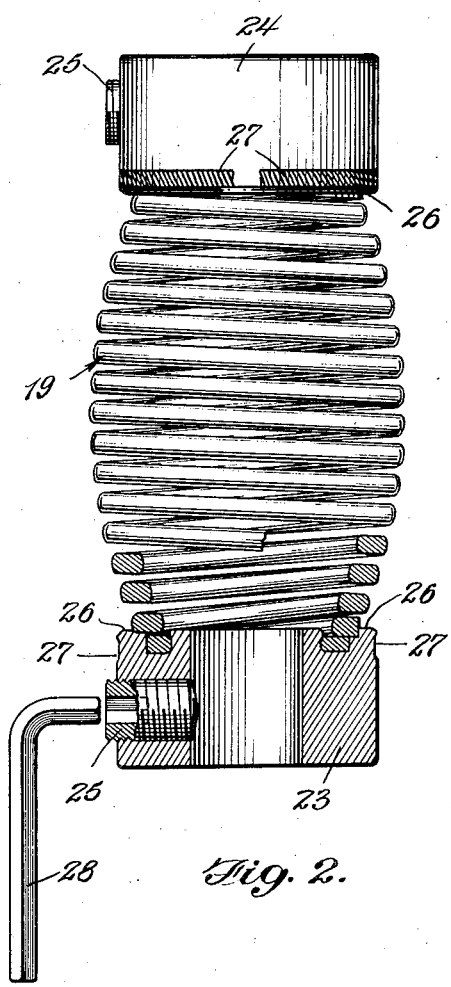

Other objects and advantages of my invention will be apparent from the following description of the embodiments thereof shown in the accompanying drawing, wherein:

Fig. 1 is a side elevational view of a pump or hot water circulator with a motor floatingly supported thereby and having a flexible coupling with the pump shaft in accordance with my invention, and Fig. 2, an enlarged side elevational view partly broken away showing details of the flexible shaft coupling.

This application is a division of my copending application for a Rotary pump, Serial Number 756,557, filed December 7, 1934.

Referring to the drawing, the rotary pump shown includes a casing 10 housing a rotary impeller which has its shaft 11 extending therefrom through a bearing member 12 carried by a casing closure member 13. Suitable lubricating means such as a grease cup 14 is provided and carried by the closure member 13 for lubricating the bearing 12. The pump structure is not shown in detail but may be of the type disclosed in the copending application referred to above.

Closure member 13 is also provided with integral motor supports including the brackets 16 extending outwardly and substantially parallel to the impeller shaft 11. In the construction shown, three equally spaced brackets 16 are provided but obviously the arrangement and form of the bracket may be widely varied if desired. A motor 17 is carried on the bracket support, the shaft 18 of said motor being connected through a flexible coupling 19 with the impeller shaft 11 of the pump. A series of coiled springs 20 are disposed between the motor 17 and the supporting bracket 16 in order to prevent the noise and vibration of the motor from being transmitted to the impeller and to insure constant alignment of the motor shaft with that of the impeller. Three or more sets of springs 20 may be provided, each set comprising two springs surrounding a bolt 21 which is in turn threaded into a plate member 22 on motor 17.

Since the bolts 21 are rigid with respect to the motor, but are yieldingly supported with respect to the brackets 16, it is apparent that motor 17 is free to move longitudinally of the impeller shaft and also radially thereof to a limited extent. It is found that by supporting the motor in this manner and connecting the same to the pump impeller through a resilient driving connection as indicated at 19, the noise and vibration of the pump and driving motor are reduced to such an extent as to be inaudible in rooms having hot water heating radiators connected to the piping system in which the pump is arranged.

It is also found that the life of the pump is substantially increased, as heretofore difficulty has been encountered in connection with the bearing for the impeller shaft. The impeller is rotated at high speed by reason of its direct connection to an ordinary high-speed electric motor, and a slight misalignment of the motor and impeller has resulted in rapid wear of the bearings, causing vibration and noise which necessitated an early replacement of the pump.

The flexible coupling 19, as best shown in Fig. 2, comprises a coiled spring secured at the ends to the collars 23 and 24 adapted to be clamped to the impeller shaft and motor shaft respectively, as for example, by means of set screws 25. The ends of the spring 19 each extend into a recess in the end of the collars and the lip 26 or edge of the recess may be swaged over the end of the spring which may be done by accurately assembling the spring between collars 23 and 24 on a mandrel and swaging the lip 26 with a knurling tool as indicated by the knurling around the end of the collar at 27. Either of the collars 23 or 24 may be adjusted in relation to the shafts 11 or 18 by loosening one or the other of set screws 25 with a wrench 28. The collars are in proper balance when set screws are tight on the shafts.

It is to be noted that the flexible coupling spring 19, is formed of a strand of spring metal flattened on its sides having a uniform cross-section throughout its length and uniformly spaced in the coiling process with the radius of the convolutions continuously increasing from each end until a maximum diameter is reached midway between the ends of the spring; the lengthwise contour of the spring is a uniform curve of revolution thus providing a spring of the formation which will be termed a barrel type spring. The uniform shape of this spring, together with the uniform winding, makes it possible to keep the spring in true alignment with its ends and makes it possible to mount the collars on the spring ends and swage them in place as above described for the purpose of securing or attaching the coupling to the driving and driven shafts. The collars can thus be kept in proper balance and alignment.

Various modifications in the construction shown and described above will occur to those skilled in the art and may be made without departing from the scope of the invention as defined in the appended claims.

I claim:

1. A flexible coupling for connecting driving and driven shafts comprising a coiled spring the strand of which is of uniform cross section through the convolutions of which the torque is transmitted and wherein the convolutions increase in diameter in successive steps of decreasing amounts from the ends to the central portion of the spring coupling.

2. A flexible coupling for transmitting torque between driving and driven shafts comprising a coiled spring the strand of which is of uniform cross section and wherein the convolutions increase in diameter by successively reduced steps to the central portion of the coupling whereby the central convolutions have the greatest torsional flexibilty and the convolutions from end to end vary in their vibratory periods of oscillation.

3. A flexible coupling for connecting driving and driven shafts comprising a coiled spring the strand of which is of uniform cross section through the convolutions of which the torque is transmitted and wherein the convolutions increase in diameter in successive steps of decreasing amounts from the ends to the central portion of the spring coupling, and an annular shaft connecting collar at each end thereof, each collar having an annular recess in which the spring ends are seated and a portion of each collar being swaged over the spring ends to hold the spring against relative movement with respect to the collar and the spring and collars concentrically, and means in said collars for adjustably securing the coupling on two shafts to be connected.

4. A flexible coupling for connecting driving and driven shafts comprising a coiled spring the strand of which is of uniform cross section through the convolutions of which the torque is transmitted and wherein the convolutions increase in diameter in successive steps of decreasing amounts from the ends to the central portion of the spring coupling, and a shaft connecting collar at each end of said spring, each collar having an annular recess in which an end of said spring is positioned with the outer portion thereof forming a lip surrounding the end of the spring, and said lips being swaged onto the ends of the spring with the shaft connecting collars positioned in true alignment and to hold them against relative movement with respect to the spring.

HOMER A. THRUSH.